United States Patent [19]

Martens et al.

[11] Patent Number: 4,576,124
[45] Date of Patent: Mar. 18, 1986

[54] APPARATUS AND METHOD FOR FLUIDLY CONNECTING A BOILER INTO PRESSURIZED STEAM FEED LINE AND COMBINED-CYCLE STEAM GENERATOR POWER PLANT EMBODYING THE SAME

[75] Inventors: Alan Martens, Berwyn; Kermit R. Wescott, Kennett Square; Bennie E. Snow, West Chester, all of Pa.

[73] Assignee: Westinghouse Electric Corp., Pittsburgh, Pa.

[21] Appl. No.: 664,638

[22] Filed: Oct. 25, 1984

[51] Int. Cl.$^4$ .................................. F22D 7/00
[52] U.S. Cl. ........................... 122/406 ST; 60/39.182; 60/646; 122/448 B; 122/451 S
[58] Field of Search .......... 122/406 ST, 451 S, 406 S, 122/448 B; 60/39.182, 646

[56] References Cited

U.S. PATENT DOCUMENTS

| | | | |
|---|---|---|---|
| 3,135,096 | 6/1964 | Schroedter | 122/406 ST |
| 3,640,250 | 2/1972 | Costello et al. | 122/406 ST |
| 3,879,616 | 4/1975 | Baker et al. | 290/40 |
| 4,019,467 | 4/1977 | Binstock | 122/406 ST |
| 4,068,475 | 1/1978 | Binstock | 60/646 |
| 4,201,924 | 5/1980 | Urani | 290/40 |
| 4,262,636 | 4/1981 | Augsburger | 122/406 ST |

Primary Examiner—Edward G. Favors
Attorney, Agent, or Firm—C. M. Lorin

[57] ABSTRACT

A coupling controller opens a dump valve at the outlet of a heat recovery steam generator when such generator is to be coupled to another generator being in operation with a steam turbine on a common header. The controller gradually permits pressure build-up until the pressure at the outlet of the new generator matches the pressure behind the header. The controller also responds to critical conditions in the superheater as well as in the high pressure drum of the generator in the operation.

4 Claims, 8 Drawing Figures

APPARATUS AND METHOD FOR FLUIDLY CONNECTING A BOILER INTO PRESSURIZED STEAM FEED LINE AND COMBINED-CYCLE STEAM GENERATOR POWER PLANT EMBODYING THE SAME

BACKGROUND OF THE INVENTION

The present invention relates in general to apparatus for, and method of, fluidly connecting a boiler into a pressurized steam feed line, and more particularly, to a combined-cycle steam generator power plant embodying such apparatus and method. For illustration, the invention will be described in the context of a combined-cycle steam generator power plant, and for this purpose U.S. Pat. Nos. 3,955,358 and 3,965,675 of L. F. Martz et al. are hereby incorporated by reference.

In a combined-cycle electric power plant, a steam turbine producing megawatts is combined with a gas turbine also producing megawatts, and the hot exhaust gases from the gas turbine, which otherwise would be lost to atmosphere, are used to heat the circulated condensate from the condenser of the steam turbine and to generate superheated steam to drive the steam turbine.

Heat recovery steam generators, e.g., boilers, are designed to extract heat from hot gases, and to convert with such heat, water into superheated steam at a relatively high pressure. At least two such boilers have been incorporated into a combined-cycle electric power generating plant including both gas and steam turbines wherein the exhaust gases of at least two gas turbines are used to heat condensate and convert it into steam for a common steam turbine.

The combined-cycle plants have been designed in the past to have at least two steam-producing boiler-and-gas turbine units associated with one steam turbine in order to maximize the supply of heat in the conversion of heat into steam, and also for versatility in control and for maximized efficiency. A problem arises, though, with such systems, which is to be able to start and couple an inactive boiler onto a boiler already actively generating steam at normal temperature and pressure to the steam turbine. It is desirable to be able to control the start of the added boiler, i.e. which is cold, so that it reaches steam quality and flow level under efficient steam production conditions and as quickly as possible after the decision has been made to add such another boiler. This should be done without changing the operative conditions of the boiler already coupled with the steam turbine power supply line. In particular, with a gas turbine there is a fixed acceleration time, since firing of the gas turbine is independent from boiler control. Within the given start-up time for both the gas turbine and the boiler, ideally, the characteristics for the gas turbine exhaust and for air and BTU flows must be properly related. Especially, there must not be any slowdown in the start-up of the gas turbine in order to accommodate the generation of steam in relation to proper coupling conditions, otherwise this would mean BTU losses.

In the prior art, coupling with the steam supply line for the turbine is effected when the latter is already under steam supply from another boiler, by merely opening a stop valve in derivation to atmosphere and waiting until the pressure build-up from the additional boiler matches the operative pressure in the feed line, at which time the dump valve is closed and the throttle valve to the supply line is opened.

U.S. Pat. No. 4,068,475 to M. H. Binstock shows start-up control of a boiler through drain flow control in order to balance boiler inflow and outflow. This technique there disclosed, however, does not involve coupling an additional boiler into a steam system already in operation.

SUMMARY OF THE INVENTION

It is now proposed to provide a dump line ahead of the header and to contain the flow of steam toward the common header of the feeder line behind a closed check valve, by controlling a stop valve inserted in the dump line so as to keep a growing flow of steam until there is a sufficient pressure build-up at the outlet of the boiler to allow coupling on the common header. As a result, time and losses in the overall boiler coupling process are minimized.

The method of coupling a boiler on a steam feed line at an operative pressure and temperature includes the steps of first opening the dump valve situated at the outlet of the boiler up to an initial minimal position, maintaining such initial position until the boiler pressure has substantially increased, then, progressively opening the dump valve fully in relation to the increase of boiler output pressure, and finally closing the dump valve while allowing flow through the header, once operative pressure has been substantially reached from the boiler.

More generally, the venting or pressure dump line with its associated control valve allows, according to the present invention, boiler outlet flow to occur independently of the steam turbine supply. Thus, initial pressure regulation can be effected independently from the gas turbine firing rate to the boiler.

A sliding pressure controller is provided associated with a venting, or pressure dump line during boiler initial pressure regulation.

The invention also provides for warm-up of the block and control valves in the main steam feed line while maintaining the superheater pressure below the saturation pressure during start-up. Moreover, the invention makes provision for reducing steam flow from the boiler outlet, should the high pressure drum level in the additional boiler begin to increase excessively.

A three-element control is provided for the start-up dump valve:

1. The high pressure drum level is used to provide high level protection action should drum swell occur due to either initial boiling that could cause water expansion, or to a sudden pressure drop which would cause flashing of the liquid in the evaporation tubes.

2. Making use of a temperature differential between high pressure (H.P.) drum and superheated steam (S.H.) outlet, should the throttle pressure become greater than the boiler outlet pressure, i.e., no flow is going into the main steam header. This is to assure regulation action in order that the steam produced remain in the superheated region.

3. Superheated steam outlet pressure is used as a parameter to provide for a minimum superheated steam flow at the output of the boiler, while limiting the water/steam blow-off i.e. waste.

The start-up of the dump valve is also provided with an override control that closes the valve, should high pressure drum level and drum level rate exceed normal levels.

DESCRIPTION OF THE PREFERRED EMBODIMENT

Figure 1:
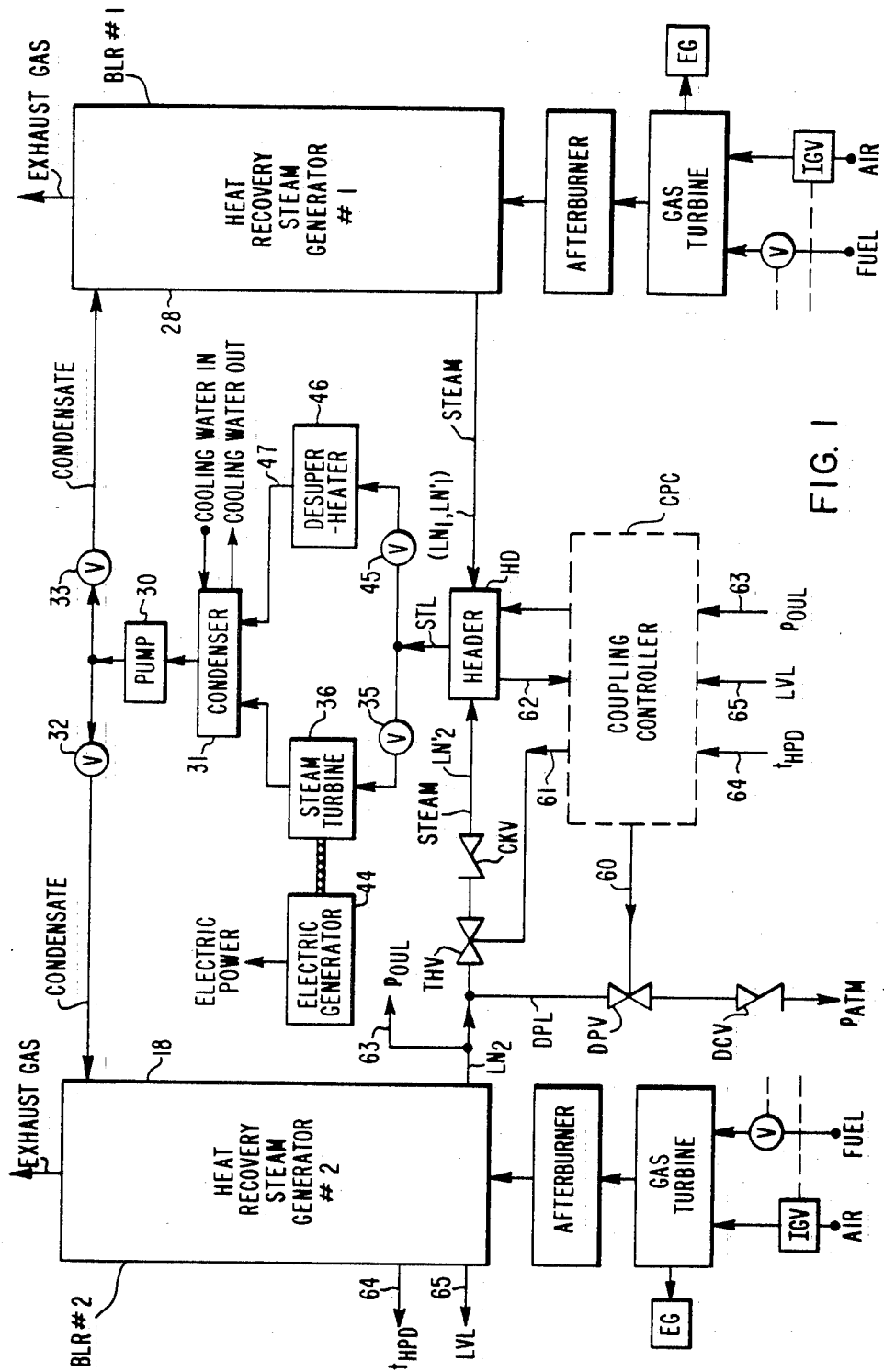
FIG. 1 is a schematic view of a combined-cycle electric power plant having two boilers operative with a common steam turbine and embodying a coupling controller according to the present invention for starting one boiler and coupling the same with the other boiler already in action.
Figure 2A:
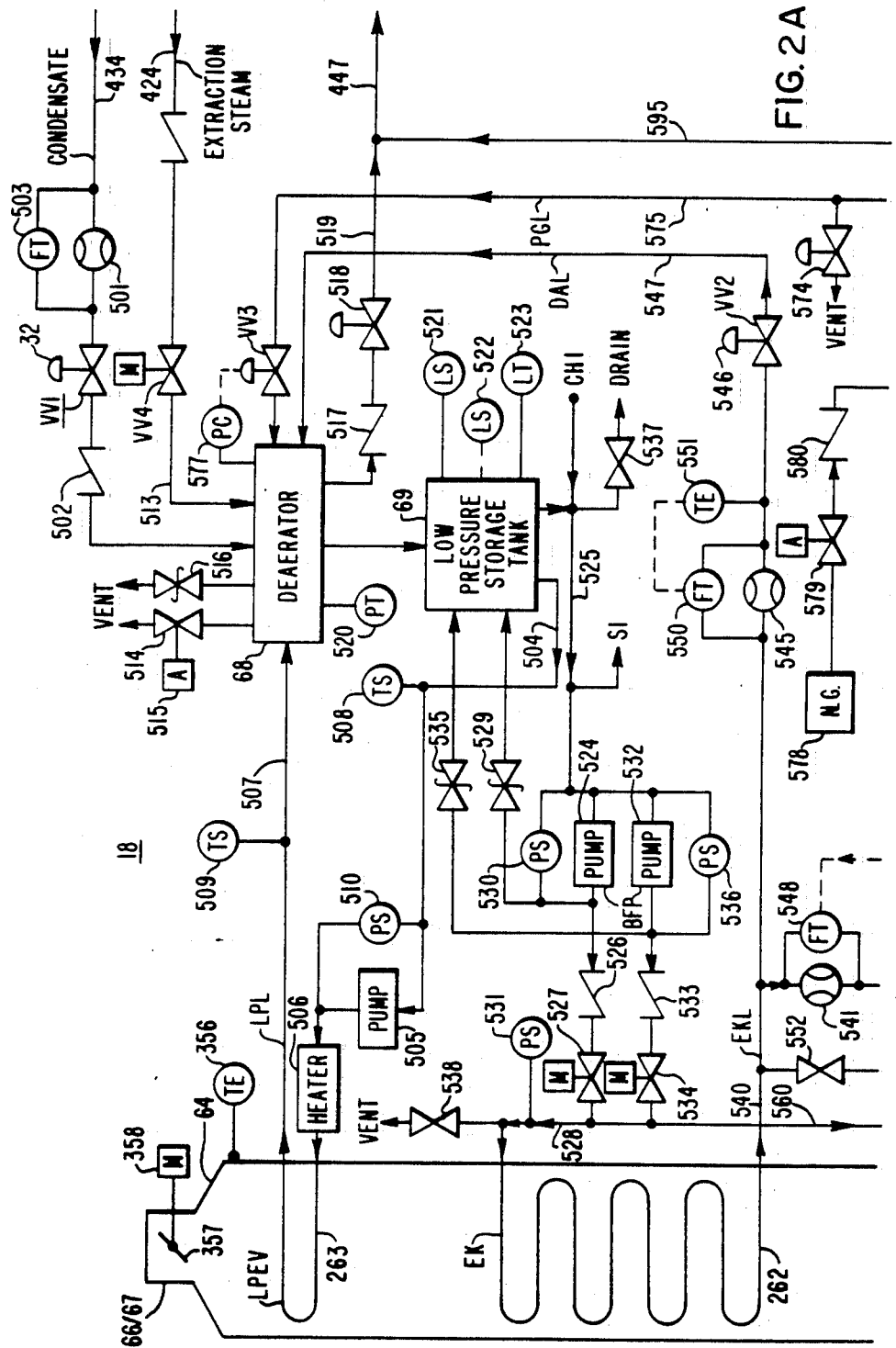
FIGS. 2A and 2B show with details the fluid interconnections between gas turbine, steam turbine and steam generator for the installation of FIG. 1.
Figure 2B:
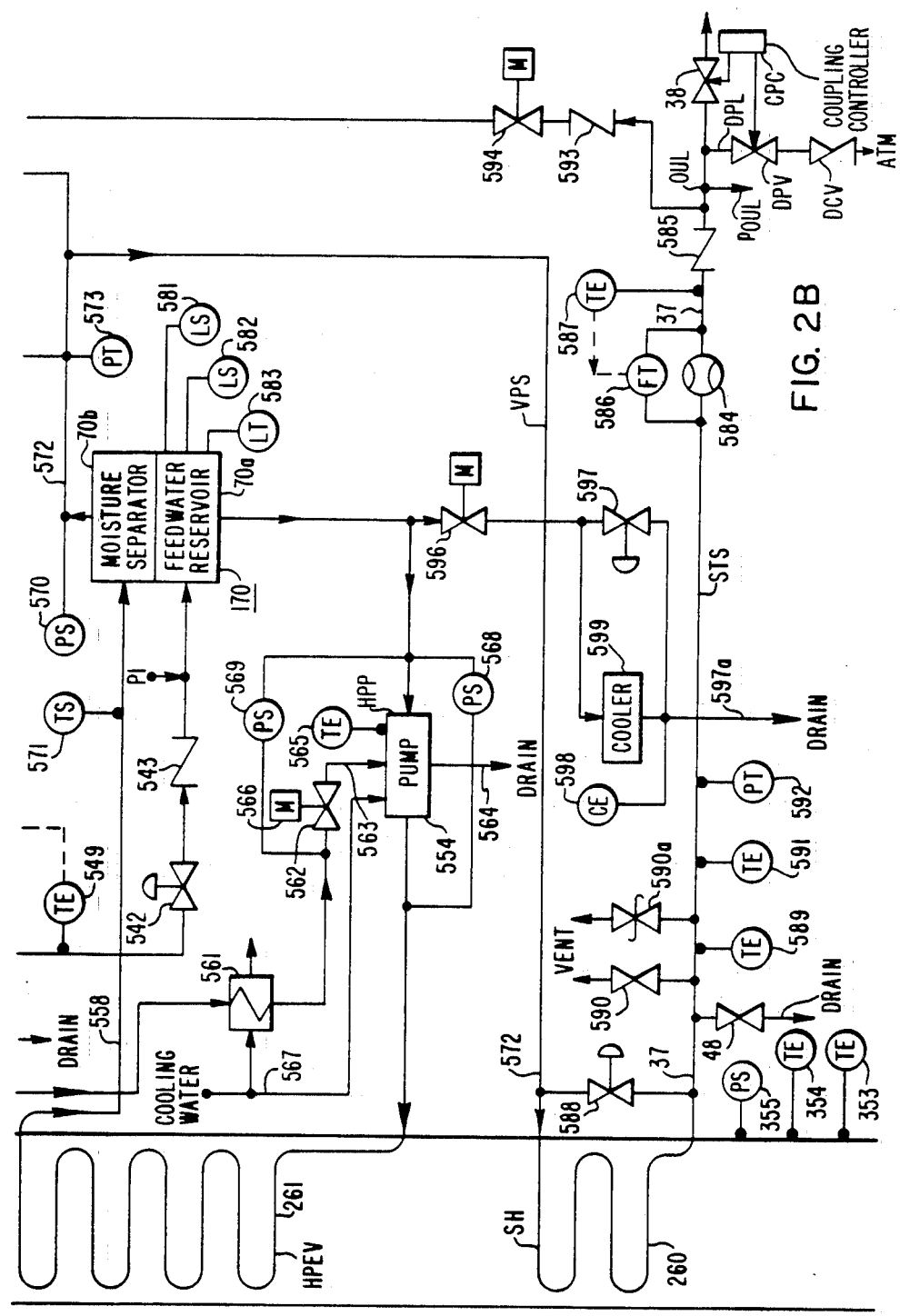

Referring to FIG. 1, a combined-cycle electrical power plant includes, centered on a steam turbine 36, two heat recovery steam generators (18, 28). The hot gas produced by the associated gas turbine and afterburner flows vertically upward in the stack structure. Feedwater from the condenser of the turbine, circulated by condensate pump 30, circulates through respective flow control valves (32, 33) into the deaerator, then, through the economizer, and the superheater tubes of the corresponding heat recovery steam generator in a downward direction, e.g. counter to the direction of gas flow. This down flow, or counter flow, in the superheater and economizer sections provides heat transfer for the steam and water moving therethrough. Evaporator sections are also provided in each heat recovery steam generator, namely, a low pressure evaporator (LPEV) near the exhaust end of the stack structure and a high pressure evaporator (HPEV) near the superheater section. In these sections, water and steam flow run in the upward direction, namely like the hot gases. Since the process evaporation is exothermal, the temperature gain is the same for either directions. The hot feedwater leaving the economizer (at approximately 570° F.) flows to the feedwater reservoir (70a in FIG. 2B) of the steam drum 170 which is associated with the high pressure evaporator (HPEV). The water level in the tank is controlled. The hot feedwater in the tank (70a in FIG. 2B) of the steam drum (170 in FIG. 2B) is pumped by a high pressure circulation pump 554 through the high pressure evaporator tubes (261 in FIG. 2B) of the HPEV, where more heat converts it into steam having a temperature of about 675° F. This steam is supplied back into the drum, namely to the moisture separator section (70b in FIG. 2B) where the remaining moisture is removed. Thus, dry steam goes from there to the superheater where it reaches an output temperature of about 952° F. This is the steam supplied, from that particular boiler of FIGS. 2A, 2B, into the supply line STL of FIG. 1 by the common header HD which provides, via valve 35, the steam to the inlets of turbine 36. The present invention involves coupling the supply line (LN'1, LN'2) of one boiler (BLR#1, BLR#2) after start-up of the associated gas turbine and after-burner to the common header HD while the latter is passing steam to the supply line STL from the other boiler (BLR#2, BLR#1) in full operation.

Figure 3:
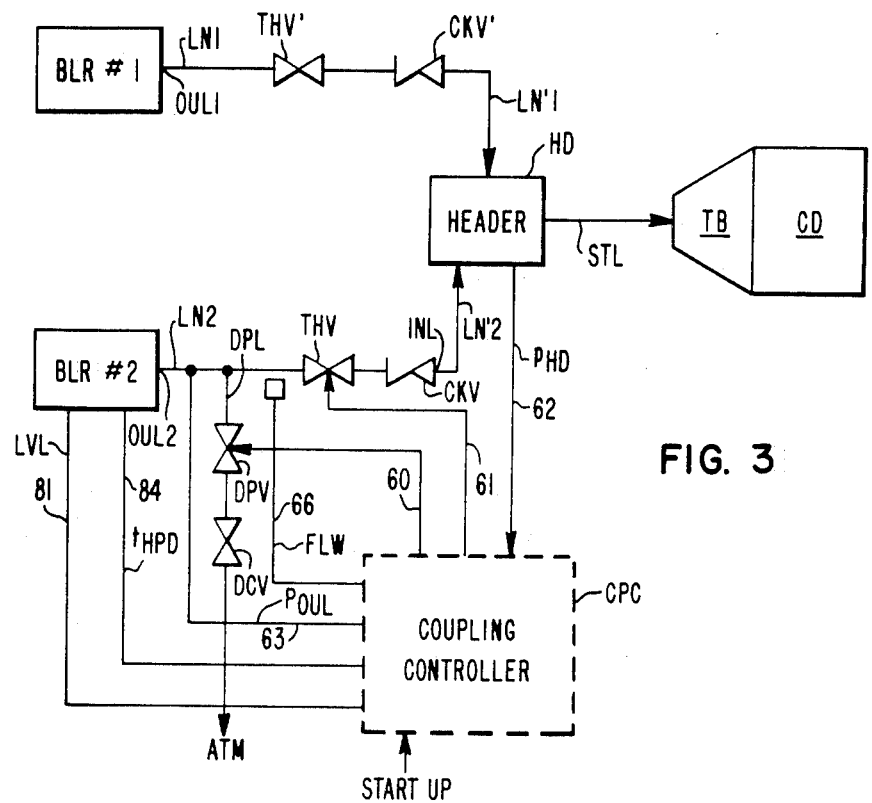
FIG. 3 is a block diagram emphasizing the control connections associated with the coupling controller of FIG. 1 in relation to the dump drain line and control valves thereof.

To this effect, referring to FIG. 3, assuming for illustration that such start-up is to be effected with boiler BLR2, steam is to be supplied via line LN2, a throttle valve THV, a check valve CKV and line LN'2 through the header HD. Boiler BLR1 is already in service providing steam through LN1, THV', CKV' and LN'1. At the outlet from the superheater of boiler BLR2 is provided a venting or dump line DPL to atmosphere including a controllable valve DPV and a check valve DCV. This means that the atmospheric pressure is prevented by check valve DCV from entering into the dump line DPL beyond that point, while steam in admission line LN2 at the outlet pressure $P_{OUL}$ is allowed, through the control action of valve DPV, to pass through line DPL to atmospheric pressure. A coupling controller CPC is provided, according to the present invention, for controlling, via line 60, valve DPV and, via line 61, the throttle valve THV, initially blocking admission of steam by admission line (LN2, LN'2) to header HD. Line LN2, LN'2 also includes a check valve CKV which has for line LN'2 a role similar to check valve DCV for line DPL. As explained hereinafter, to effect controlling action, coupling controller CPC responds to signals derived from several locations in the system. Referring to FIG. 1, or FIG. 3; pressure $P_{HD}$ in the header is derived on line 62; pressure $P_{OUL}$ at the outlet OUL of the steam generator, e.g. in admission line LN2 is derived on line 63; temperature $t_{HPD}$ in the high pressure drum HPD is derived on line 64; the level in the drum is sensed and derived on line 65; flow to the header through line LN2, LN'2 is sensed and the indication derived from line 66. Control of the dump valve DPV is by line 60. Control of the "throttle" valve THV is by line 61.

Referring again to FIGS. 2A and 2B, the coupling controller is shown in circuit (CPC in FIG. 2B) associated with the flow, piping and instrumentation of boiler BLR2, the latter being as disclosed and referenced in U.S. Pat. No. 3,965,675 previously incorporated by reference. Valve THV of FIG. 1 is referenced as valve 38 in the patent and in FIG. 2B.

Figure 4A:
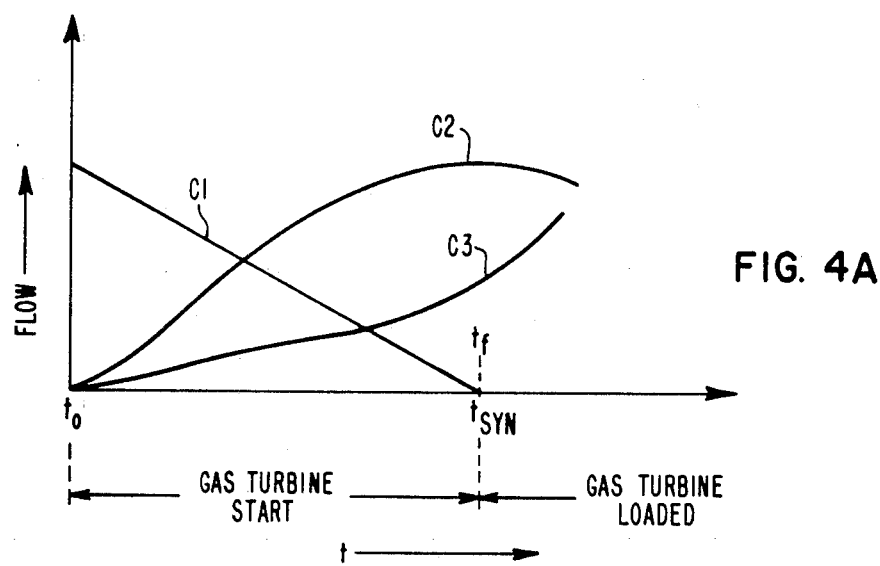
FIGS. 4A, 4B and 4C are curves illustrating the operation of the dump valve associated with the coupling controller of FIGS. 1, 2A, 2B or 3.

The invention will now be explained in its operative mode by reference to the curves of FIGS. 4A and 4B. FIG. 4A shows with curve ($C_1$) an initial ramp characterizing gas turbine exhaust temperature during start-up from initial instant $t_o$ to instant $t_{SYN}$ when, due to synchronization, the turbine is in operation. Curves ($C_2$) and ($C_3$) represent the flow of air ($C_2$) taking up the heat in the stack of the boiler and the flow of steam ($C_3$) as it builds up and evacuates heat from the stack in the heat exchange process. At instant $t_f$, the heat recovery generation process is at its full operation level. Then, the gas turbine exhaust temperature from the stack is minimal, when the turbine is running ready to take load and produce kilowatts. At the same time, the BTU flow (curve $C_3$) of feedwater is maximal, which matches the air flow in the counter direction, e.g., upward in the stack. Ideally there is as much heat given away by the air flow as there are BTU's taken up by the steam down to the superheated stage at the outlet. Within this span of time, ($t_o-t_{SYN}$) the steam must have reached such a level in superheated quality, in temperature and pressure that the throttle valve THV (FIGS. 1, 2 and 3) can be opened, namely when the pressure from the supply line STL of boiler BLR2 is about the same as the operating pressure, on the other side of the common header, from boiler BLR1. It is the object of the present invention to allow pressure build-up before valve THV in the quickest time so that normal operation with two boilers BLR1 and BLR2 can take place at time $t_f$, or closely to it. This approach is in contrast to drain valve control effected in response to throttle pressure as disclosed in U.S. Pat. No. 4,068,475 of M. H. Binstock, where the pressure build-up disclosed is controlled in regard to the start-up of the steam turbine, rather than the start-up of the gas turbine as in the present situation.

As shown in FIGS. 1, 2A, 2B and 3, a dump line DPL is provided at the steam outlet of the boiler BLR2, on the steam line supply to the steam turbine, via throttle valve THV and check valve CKV. At the start, throttle valve THV is closed preventing admission of steam toward header HD. An operative pressure in the steam line STL under supply of steam from the other boiler BLR1 is for instance 800 psig. This is due to steam flow only from boiler BLR1 via line LN1, through throttle valve THV' and check valve CKV' to header HD and, from there on, to turbine TB by supply line STL. Check valve CKV' is open under flow, whereas check valve CKV in the supply line LN2 from boiler BLR2 is blocked and will so remain until pressure build-up ahead of it through throttle valve THV will match the pressure in the header.

Dump line DPL creates a bypass to steam flow from the outlet of boiler BLR2 which, via dump control valve DPV and check valve DCV, goes to atmospheric pressure. Such bypass prevents premature build-up of steam pressure at the inlet of the throttle valve THV while it is closed. Control of dump valve DPV is important at start-up of the boiler in two respects. First, it allows a controlled raise of pressure while the boiler is building up steam, such rise of pressure being allowed to progress until it nearly matches the critical level for check valve CKV to open. Secondly, it maintains a definite but limited flow of steam from the boiler, during the critical phase when heat is being applied to cold feedwater, and working steam is not yet available for the turbine. It is important at this early stage to have a minimum flow of steam from the heat recovery steam generator. Moreover, such minimum flow must be the flow needed for the superheater to function in the feedwater circulating and heat exchange processes. Such steam flow must also maintain the superheat state, which means that the temperature should be maintained so that saturated steam not be generated. Such measured level of flow is in contrast to a too fast increase of flow which would cause bubble formation in the drain associated with the high pressure evaporator, and the formation of bubbles could cause the drum to swell.

Figure 4B:
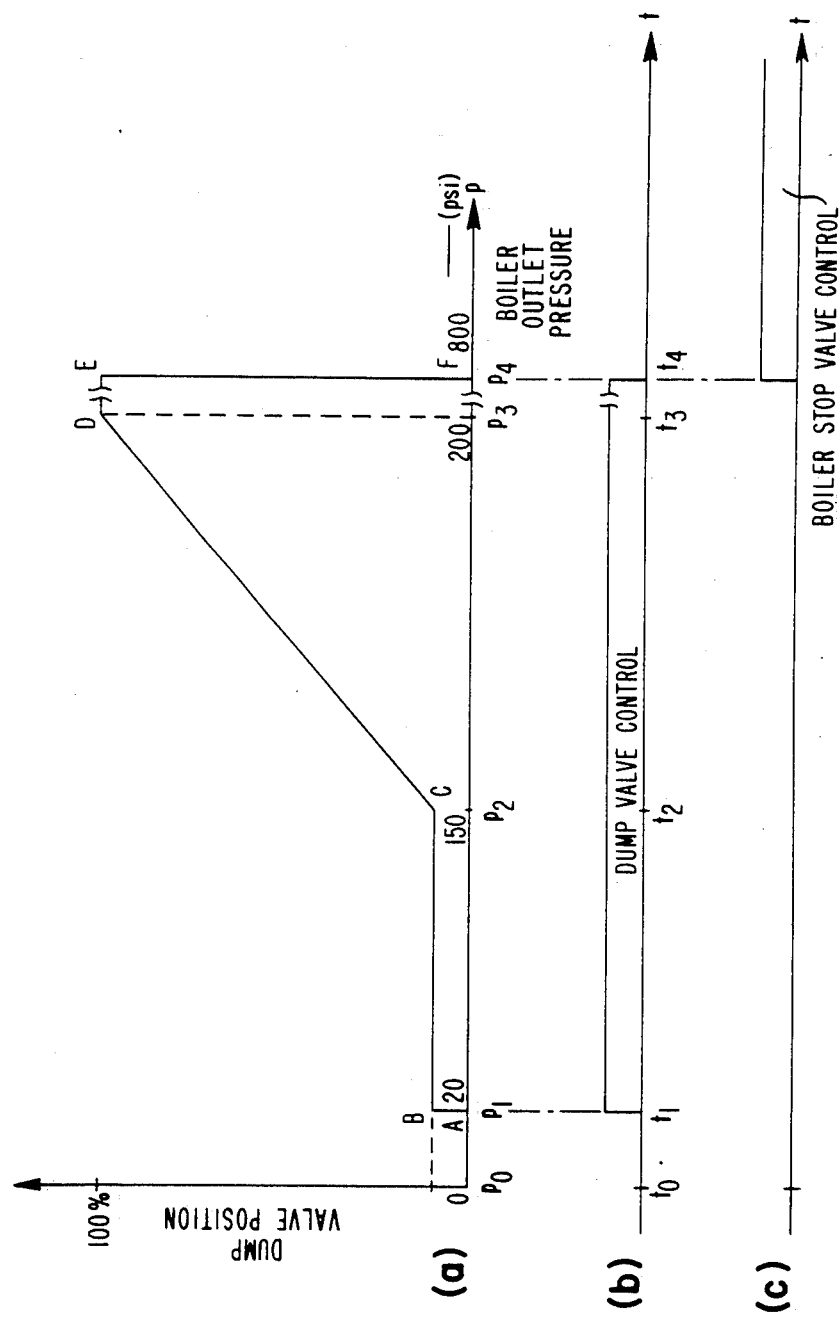

Referring to FIG. 4B, the method used to bring up pressure faster in the boiler outlet, while keeping the flow down so as to minimize time and losses during the steam generation build-up, is illustrated by curve (a) which shows positioning of the dump valve DPV as a function of pressure build-up by boiler BLR2. Initially the position is zero at zero pressure $P_o$. A dead time is allowed with the dump valve closed until at $P_1$ the pressure has become typically at least 20 psig. From that instant ($t_1$) the valve is opened from A to B, e.g. just by a small percentage and held at such limited open position from B to C, i.e. when the pressure build-up has risen from typically 20 psig to a predetermined value $P_2$, typically 150 psig. From C to D, valve DPV is allowed to open gradually, typically at a constant rate, until maximum at D. At that moment ($t_3$) the pressure may be typically $P_3=200$ psig. Then, the pressure continues to build up until $P_4$ where it is close to the header pressure, typically of 800 psig (instant $t_4$).

Figure 4C:
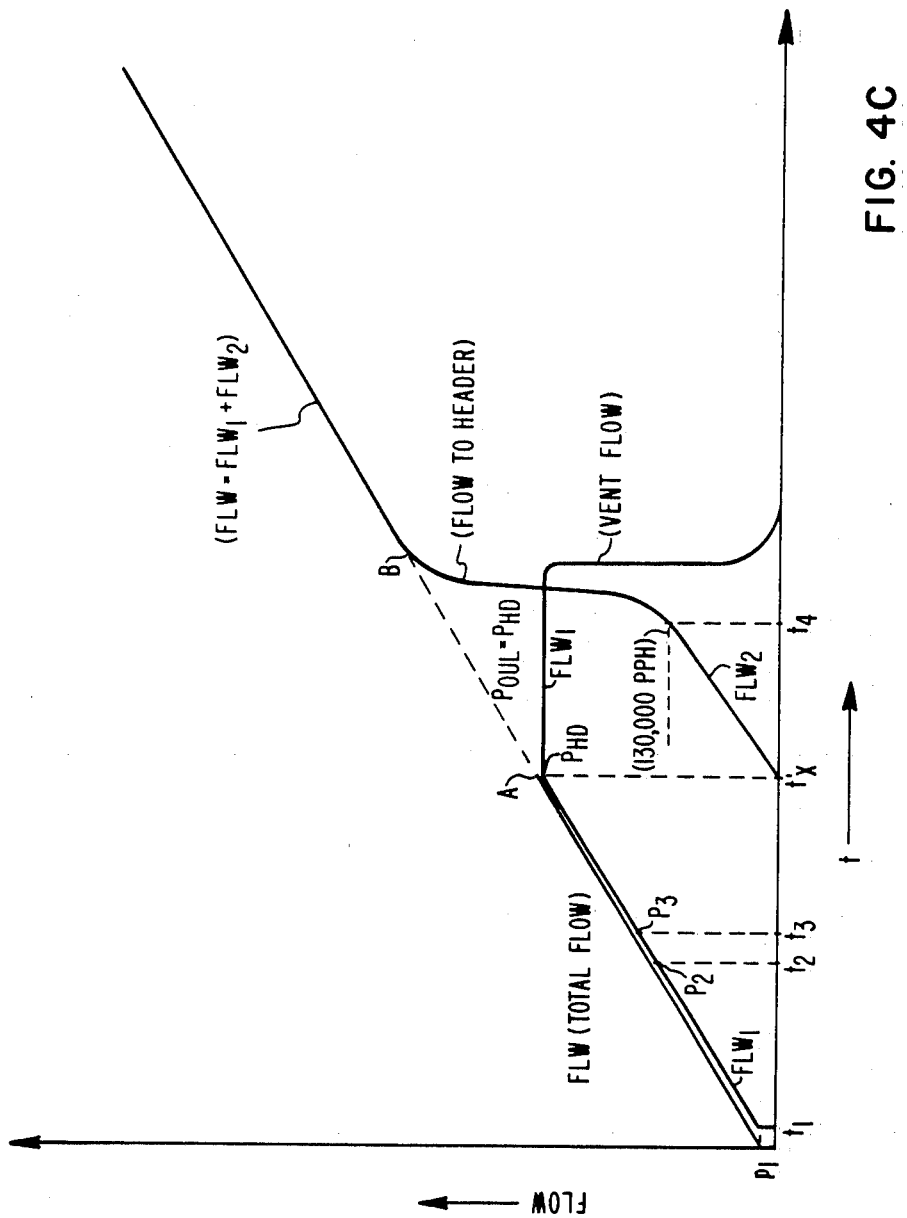

With regard to the operation of the dump valve DPV, reference may be had to FIG. 4C. Flow through valve DPV is increasing progressively as the boiler comes into pressure, following the line FLW, as shown for the total flow from the boiler. From time $t_1$ through times $t_2$ and $t_3$ total flow is through the valve DPV. Then, at time $t'_x$ the pressure in the output line of the boiler reaches a value equal, or nearly, to the pressure at the header. At that time, the flow keeps level in the dump valve while it starts to build up toward the header as shown by curves $FLW_1$ and $FLW_2$, respectively. When flow in the supply line to the header reaches a critical value, typically of 130,000 PPH, then, the stop valve opens (time $t_4$), flow builds up rapidly toward the header and, quasi-simultaneously, the dump valve is closed. The sum of the flows ($FLW_1$ and $FLW_2$) becomes all $FLW_2$ along FLW beyond point B, whereas it was all $FLW_1$ before point A on FLW.

Figure 5:
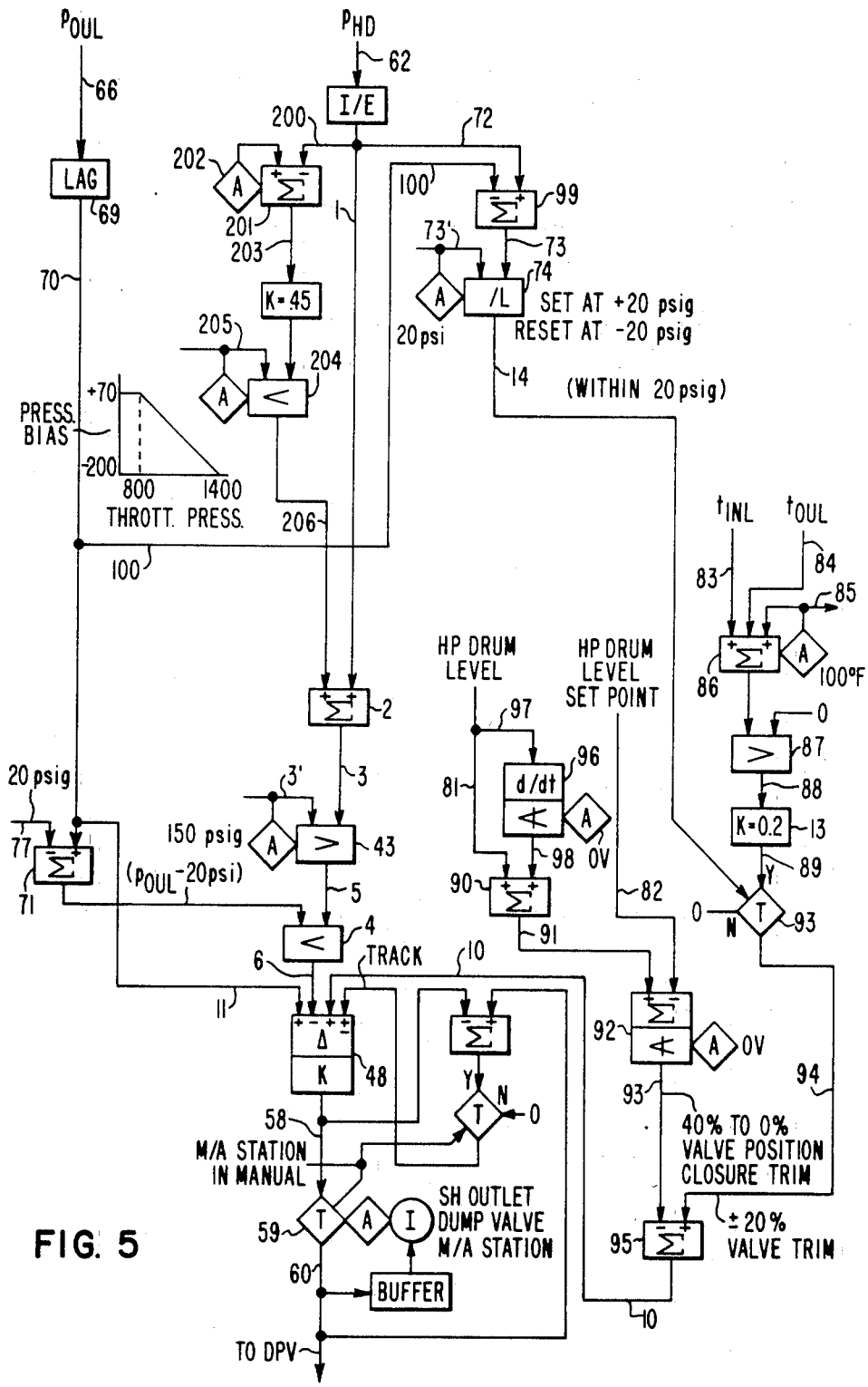
FIG. 5 is electrical circuitry illustrating a possible implementation of the coupling controller of FIGS. 1, 2A, 2B or 3.

The implementation of dump valve control in accordance with FIG. 4B is illustrated by the circuitry of FIG. 5, making use of the head pressure ($P_{HD}$) current signal, derived from line 62, which is converted into a voltage signal on line 1. The boiler outlet pressure ($P_{OUL}$) signal is derived on line 66, received at 70 with a lag of 2 seconds (at 69) and conveyed by lines 70 and 11 to the dump valve controller 48. Controller 48 also receives on line 6 a signal derived as follows: The header pressure signal of line 1 is summed at 2 with a bias signal on line 206 which overrides line 1 should the pressure of the boiler become too large. The signal of line 200 which is the signal of line 1 is used as a subtrahend from a critical value at 202 so that, when the signal at 200 becomes excessive, subtractor 201 will generate on line 203 an alarm signal which will overcome at 204 a limit (set at 205) and the resulting the signal on line 206 will command dump valve DPV to close as a safety measure. Assuming this does not occur, the signal of line 1 is found on line 3 where it is compared with a $P_2=150$ psig setpoint (derived at 3'), so that the high select circuit 43 will react to pass 150 psig or more, if the pressure of line 1 goes beyond it. However, the outlet pressure from lines 66 and 70 is converted, by summer 71 and a subtrahend of 20 psi at 77, into a signal representing ($P_{OUL}-20$), which is the value required at instant $t_1$ of FIG. 4B to open valve DPV. This occurs by line 5' (which is combined with output line 5 from high select circuit 43 into a low select circuit 4 to derive a set point signal on line 6) and line 11 which inputs into the dump valve controller 48. Controller 48 receives as a negative signal the setpoint signal of line 6, so that, when ($P_{OUL}-20$) reaches the critical value of 150 psi the controller will move the valve, as shown, toward the open position from C to D.

Controller 48 also receives a signal on line 10 which, under certain critical conditions, introduces, as precautionary measures, some reductions in the operation of the controller, namely a reduction of 40% to 0% by line 93, or a trimming by ±20% by line 94 as hereinafter explained.

The pressure $P_{OUL}$ (actual) and the header pressure $P_{HD}$ are compared (one from lines 66, 70 and 100, the other from lines 62 and 72) in a comparator 99. The error derived on line 73 is compared to a 20 psi setpoint (line 73') and a low limit circuit 74 is set at +20 psi, and reset at −20 psig, so that by output line 14 a switch 93 can be commanded (by line 14) to inhibit such trimming at ±20%, whenever the two pressures are very close. Otherwise, the trimming is effected in accordance with the signals of line 83 and 84, one being the inlet temperature $t_{INL}$, and the other the outlet temperature $t_{OUL}$ for the superheater. If they happen to be distant by more than 100° F. (setpoint at 85), then, trimming should be performed. This requirement appears as a condition beyond high select 87 which has a zero output when the condition is not met. From circuit 87, the outputted signal of lines 88, 89 goes to the Y-position of the trim switch 93. Similarly, the HP drum level derived on line 81 and the HP drum level setpoint derived on line 82, are compared by comparator 92 (with the additional feature for sensitivity of control that the rate is derived from lines 81 and 97 by differentiator 96, and outputted on line 98 onto summer 90) which outputs on line 93 a command passed through summer 95 on the negative side thereof together with the ±20% valve trim signal of line 94, to trim the valve position closure (by line 10 to controller 48), should the HP drum level exceed the critical level.

We claim:

1. Apparatus for starting a steam boiler and for coupling a steam output thereof through a throttle valve and a header to a steam feed line at an operative pressure and temperature comprising:

means for draining through a bypass line steam from said steam output before said throttle valve with said throttle valve being closed initially;

with said draining means including a controlled drain valve and control means controlling said drain valve in a first mode for admitting a derivation flow at predetermined minimal constant flow level in said bypass line as the pressure of said steam output is increasing from substantially zero level; said controlled valve in a second mode admitting in said bypass line from said steam output a derivation flow increasing in relation to the increase of said steam output;

said control means controlling said draining means in the second mode to pass a derivation flow corresponding substantially to said operative pressure at said steam output for closing said drain valve and subsequently for opening said throttle valve, whereby said header receives steam concurrently from said feed line and from said boiler at substantially the same operative pressure;

with first means for sensing the operative pressure in said header;

second means for sensing pressure of said output steam;

said control means being responsive to a pressure intermediate between said substantially zero level pressure and said operative pressure to shift operation from said first mode to said second mode.

2. The apparatus of claim 1 with said first means providing a first representative signal, with said second means providing a second representative signal;

with said control means including means for providing a third signal representative of said intermediate pressure;

said control means comprising:

means responsive to the larger of said first signal and said third signal for generating a fourth signal, and means responsive to the lesser of said fourth signal and said second signal for generating a fifth signal, controller means being provided responsive to said fifth signal for generating a command signal for said drain valve in relation to said second signal when said second signal is lesser than said third signal, and in relation to said first signal when said second signal is larger than said third signal.

3. The apparatus of claim 2 with said boiler including a high pressure evaporator and a superheater operating jointly to generate said output steam, with a high pressure (HP) drum associated with said high pressure evaporator, said HP drum having a feedwater level, means being provided for deriving a signal representative of HP drum level and for deriving a seventh signal representative of HP drum saturation pressures;

with means responsive to the difference between said sixth and said seventh signal for generating an opposite signal, said controller means being responsive to said opposite signal whereby said opposite signal reduces the effect of said fifth signal upon said drain valve to the extent that said HP drum level is increased and to the extent that said pressure of saturation is decreased.

4. The apparatus of claim 2 with means for sensing the temperature of said outlet stream to derive an eighth signal, with means for generating a ninth signal representing the desired superheat temperature;

means being provided for comparing said eighth and ninth signals to denote an error signal, and means operative when said steam output pressure is substantially close to said operative pressure to respond to said error signal for generating a trimming signal, said trimming signal being applied to said controller means to trim the effect of said fifth signal upon said drain valve.

* * * * *